(12) United States Patent
Lin

(10) Patent No.: US 8,346,023 B2
(45) Date of Patent: Jan. 1, 2013

(54) USER CONTROL OF COMPUTER PERIPHERAL APPARATUSES TO PERFORM TASKS ACCORDING TO USER INPUT IMAGE FILE

(76) Inventor: Bo-In Lin, Los Altos Hills, CA (US)

( * ) Notice: Subject to any disclaimer, the term of this patent is extended or adjusted under 35 U.S.C. 154(b) by 994 days.

(21) Appl. No.: 12/378,453

(22) Filed: Feb. 13, 2009

(65) Prior Publication Data

US 2009/0208144 A1   Aug. 20, 2009

Related U.S. Application Data

(63) Continuation-in-part of application No. 11/788,889, filed on Apr. 22, 2007, now Pat. No. 8,200,009.

(60) Provisional application No. 61/065,729, filed on Feb. 13, 2008, provisional application No. 61/130,247, filed on May 28, 2008.

(51) Int. Cl.
*G06K 9/20* (2006.01)

(52) U.S. Cl. ......... 382/321; 382/317; 382/318; 358/505

(58) Field of Classification Search .................. 382/317, 382/318, 321; 358/505, 506
See application file for complete search history.

(56) References Cited

U.S. PATENT DOCUMENTS

| | | | | |
|---|---|---|---|---|
| 5,355,411 | A * | 10/1994 | MacDonald | 713/186 |
| 6,389,151 | B1 * | 5/2002 | Carr et al. | 382/100 |
| 6,659,038 | B2 * | 12/2003 | Salva Calcagno | 118/31.5 |
| 6,970,573 | B2 * | 11/2005 | Carr et al. | 382/100 |
| 7,349,987 | B2 * | 3/2008 | Redlich et al. | 709/244 |
| 7,515,315 | B2 * | 4/2009 | Ferlitsch | 358/474 |
| 7,533,066 | B1 * | 5/2009 | Robinson et al. | 705/76 |
| 7,783,563 | B2 * | 8/2010 | Tidwell et al. | 705/38 |
| 7,958,268 | B2 * | 6/2011 | Redlich et al. | 709/246 |
| 7,996,334 | B2 * | 8/2011 | Tobin et al. | 705/59 |

* cited by examiner

*Primary Examiner* — Yosef Kassa
(74) *Attorney, Agent, or Firm* — Bo-In Lin

(57) ABSTRACT

A computer peripheral apparatus (CPA) provided for connecting to a computer. The CPA includes a CPA processor to execute a CPA program to independently and directly carry out a document processing function without receiving an instruction from a computer. In an exemplary embodiment, the CPA includes a scanner for scanning a document and the CPA processor executes a optical character recognition (OCR) program to directly recognize characters included in the document scanned by the scanner. In another exemplary embodiment, the characters recognized by the OCR program further include instructions for instructing the CPA processor to execute a subsequent program to process the document scanned by the scanner. In another exemplary embodiment, the characters recognized by the OCR program further includes instructions for instructing the CPA processor to send a facsimile of the document scanned by the scanner to a facsimile destination. In another exemplary embodiment, the characters recognized by the OCR program further includes instructions for instructing the CPA processor to save the document recognized by the OCR program as a text file in a data storage as part of the CPA processor.

20 Claims, 8 Drawing Sheets

Fig. 2A

| Sourcebook Special Section | | |
|---|---|---|
| For additional information on the corporations and products mentioned in-fee section, visit their website or call the number listed below | | |
| PRESENTATION TECHNOLOGIES | | |
| Multimedia Smarts-Power-point Software | 800-752-0800 | 877-86S-SONY |
| Digital Juice-Presentation Technologies | Pioneer | BenQ |
| www.multimedia.com | www.pioneerelectronics.com | www.Benq.com |
| 800-525-2203 | Iomega | 866-760-2367 |
| Crystal Graphics- Power Plugs | www.iomega.com | Ptos |
| www.crystalgraphics.com | 888-5T6-8456 | www.plus-america.cam |
| 408-496-6175 | Plextor | 866-427-8835 |
| Right Send Vox Proxy Version 3 | www.plextor.com | Fujitsu |
| www.voxproxy.com | 866-856-8357 | www.fujitsu.com/us |
| 303-278-2244 | LACie | 800-831-3183 |
| Video To Go | www.lacie.com | |
| LG Electronics-16x Super Multi DVD Rewriter | 503-844-4S00 | BUSINESS PRODUCTIVITY |
| http://us.lge.com | Brilliant Shows-Projectors | Content Management |
| 800-243-0000 | Hitachi Performer | Adobe Acrobats |
| BenQ | www.hitachi.us/digitalmedia.com | www.adobe.com |
| www.b8nq.com | 650-589-8300 | 888-724-8508 |
| 866-700-2367 | NEC Visual Systems | |
| | www.neevisdal.systems.com | On Demand Offices |
| HP | 800-NEC-INFO | Regus |
| www.hp.com | InPocus | www.regus.com/ |
| | www.infocus.ooRi | productivity |
| | 800-294-6400 | 877-REGJS-47 |
| | Epson | |
| | www.epson.com | Input to Go |
| | 1-800-GO-EPSON | Planeo, |
| | Sony | wiwsptacon.com |
| | www.sonystyle.com | 905^07-3926 |

| Company | Website | Telephone | Product Type | Remark |
|---|---|---|---|---|
| HP | www.hp.com | 800-752-0900 | Presentation Technologies | |
| BenQ | www.beng.com | 866-700-2367 | Presentation Technologies | |
| IOGear | www.IOGear.com | 866-9-IOGEAR | Business Productivity | |
| Logitech | www.logitech.com | 800-231-7717 | Business Productivity | |
| | | | | |
| | | | | |
| | | | | |
| | | | | |
| | | | | |
| | | | | |
| | | | | |

Fig. 2B

ACTION: COMPRESS
STORE: ARCHIVE/PATENTS

US005763319A

United States Patent [19]
Ling et al.

[11] Patent Number: 5,763,319
[45] Date of Patent: Jun. 9, 1998

[54] PROCESS FOR FABRICATING SEMICONDUCTOR DEVICES WITH SHALLOWLY DOPED REGIONS USING DOPANT COMPOUNDS CONTAINING ELEMENTS OF HIGH SOLID SOLUBILITY

[75] Inventors: Peiching Ling, San Jose; Tien Tien, Sunnyvale, both of Calif.

[73] Assignee: Advanced Materials Engineering, Sunnyvale, Calif.

[21] Appl. No.: 656,273
[22] PCT Filed: Jan. 19, 1996
[86] PCT No.: PCT/US96/00732
  § 371 Date: Jun. 5, 1996
  § 102(e) Date: Jun. 5, 1996
[87] PCT Pub. No.: WO97/07534
  PCT Pub. Date: Feb. 27, 1997

Related U.S. Application Data

[63] Continuation-in-part of Ser. No. 514,757, Aug. 15, 1995.
[51] Int. Cl.⁶ ............................................. H01L 21/265
[52] U.S. Cl. ......................... 438/514; 438/514; 438/528
[58] Field of Search ............................. 438/514, 515, 438/518, 520, 544, 918, 306, 528; 427/523, 527

[56] References Cited

U.S. PATENT DOCUMENTS

| | | |
|---|---|---|
| 4,774,195 | 9/1988 | Benking . |
| 4,928,156 | 5/1990 | Alvis et al. . |
| 5,073,507 | 12/1991 | Keller et al. . |
| 5,126,278 | 6/1992 | K<daim . |
| 5,254,484 | 10/1993 | Hafner et al. . |
| 5,354,696 | 10/1994 | Oostra et al. . |
| 5,453,404 | 9/1995 | Leedy . |
| 5,489,550 | 2/1996 | Moslehi . |
| 5,508,208 | 4/1996 | Sato . |

Primary Examiner—John Niebling
Assistant Examiner—S. Mulpuri
Attorney, Agent, or Firm—Coudert Brothers

[57] ABSTRACT

A method for manufacturing shallowly doped semiconductor devices. In the preferred embodiment, the method includes the steps of: (a) providing a substrate where the substrate material is represented by the symbol Es (element of the substrate); and (b) implanting the substrate with an ion compound represented by the symbol $El_xEd_y$, where El represents an element having high solubility in the substrate material with minimal detrimental chemical or electrical effects and can be the same element as the substrate element. Ed (dopant element) represents an element which is an electron acceptor or donor having high solubility limit in the substrate material, and x and y indicate the number of respective El and Ed atoms in the ion compound.

38 Claims, 1 Drawing Sheet

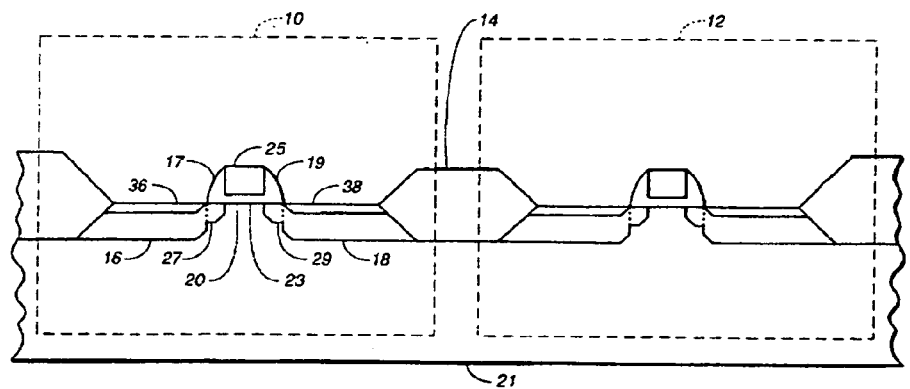

Fig. 4

| |
|---|
| Action 1: Turn on lights on area A |
| Action 2: Turn on Video camera |
| PW: |
| Thumb Print: |
| Signature: |
| Answer 1: |

USER CONTROL OF COMPUTER PERIPHERAL APPARATUSES TO PERFORM TASKS ACCORDING TO USER INPUT IMAGE FILE

This Non-provisional patent application is a continuation in Part application and claims priority of U.S. Non-provisional patent application Ser. No. 11/788,889 filed Apr. 22, 2007 now U.S. Pat. No. 8,200,009 by the Applicant of this patent application under Title 35 of the United States Code. This Non-provisional patent application further claims Priority of two other U.S. Provisional Application 61/065,729 filed by the same Applicant of this application on Feb. 13, 2008 and U.S. Provisional Application 61/130,247 filed by the same Applicant of this application on May 28, 2008. The disclosures made in the application Ser. No. 11/788,889, U.S. Provisional Application 61/065,729, and U.S. Provisional Application 61/130,247 are hereby incorporated by reference in this patent application.

BACKGROUND OF THE INVENTION

1. Field of the Invention

This invention relates generally to the multi-functional peripheral (MFP) apparatuses provided for connecting to a computer to receive commands and instructions from the computer to perform functions such as printing, copying, sending/receiving facsimiles, scanning of documents, and/or displaying/projecting images. More particularly, this invention relates to an improved computer peripheral apparatus (CPA) either controlled by a computer to perform tasks according to instructions written in a scanned image document, or a CPA includes CPA's own processor with a data storage capacity and/or portable storage devices interface ports for storing data into portable data storage devices to intelligently perform functions without requiring instructions from a computer.

2. Description of the Prior Art

Even though the recognition accuracy and processing speed of the optical character recognition (OCR) technologies have made significant progresses in recognizing characters from the scanned images, there are still technical limitations that prevent a user to more conveniently apply the OCR technologies to efficiently carry out related functions and tasks. As of now, a multi-functional peripheral (MFP) apparatus such as a copier/scanner/fax/printer apparatus is connected to a computer and operated according to commands and instruction received from the computer as a passive and dependent device. A user has to execute specific program, or even programs, through a computer in order to control and operate the peripheral apparatuses. The additional requirements to control the computer peripheral apparatus (CPA) and MFP apparatus through a computer impose unnecessary limitations to the functionalities and usefulness of the CPA and the MFP apparatus and also cause a waste of user's time to operate the CPA and the MFP apparatus.

Conventional computer peripheral apparatuses (CPA) also include an image projector connected to a computer. A user operates the image projector connected to a computer is required to control the projector by entering commands and instructions on the computer to display images stored as a computer file, such as a Power Point file. The peripheral apparatuses as implemented now are operated almost entirely as a passive device without much intelligence.

The peripheral apparatuses such as image display monitors, image projectors, printers, and/or the MFP apparatuses generally have no intelligence or capabilities to operate and control the functionalities of their own operations. Such limitations thus significantly limit the operational flexibilities and functionalities of such apparatuses.

As of now, many of the optical recognition programs are providing more intuitive controls for user to marked the desired scanned areas on the scanned images for optically recognizing only the designated areas. However, after marking out the scanned and ignored areas, and marking out some scanned areas for the OCR program to process as text or as graphic element, other than an option for a user to proof read the recognized text by the OCR program, a user still has very limited control over the desired data types, file formats and file types and the content organization and structure of the OCR outputs.

More specifically, the optical character recognition programs as now available are still image oriented. The optical character recognition program basically performs merely primitive recognition operations from raw image according to the location and shapes of the image elements. Almost all the intelligence and user control are directed to the checking the accuracy of the character recognition results and correction of the incorrect OCR output. Other than allowing a user to correct errors of character recognition, there is no further management and processes after the initial recognition operations. However, a user of the OCR often has other purposes than making sure all the image characters are correctly recognized. It is often required that the data and information included in a scanned document be further processed to produce a document that is further organized or tabulated to produce a file of certain formats. Conventional OCR techniques and programs however do not provide such user control functions and the practical usefulness of the OCR programs is therefore greatly limited.

Furthermore, in a co-pending application Ser. No. 11/788,889, the Applicant of this invention also disclosed an OCR system to function with flexibilities for controlling the desired file formats, document organization and content arrangements of the output file. The disclosures made in the co-pending patent application Ser. No. 11/788,889 further provides a scanning/OCR function to recognize a first section of an image document that includes commands and/or instructions to invoke the executions of different programs and functions. However, the recognition and execution of the commands and/or instructions are essentially depending on software/hardware functions carried out by a computer. The computer peripheral devices are controlled by a computer as a passive device without much intelligence.

Therefore, there is still a need in the art of designing and fabricating CPA and MFP apparatuses to provide new and improved device configurations with data processing and file management functions such that the above discussed limitations and difficulties can be overcome.

SUMMARY OF THE PRESENT INVENTION

One aspect of the present invention is to provide a new and improved computer peripheral apparatus (CPA) to include a local functional processing unit that may be implemented as a CPA processor residing locally in the CPA to execute programs, or implemented as a hardware/software functional unit to control the peripheral apparatus to perform specific functions without requiring a user to enter commands and instructions from a computer. A CPA can therefore more flexibly and independently carries out more functional tasks to streamline a user's controllable tasks including document processing works, display or other tasks specifically for the CAP for achieving timesaving and productivity enhancements.

It is a specific aspect of the present invention to provide a scanner to scan optical images including printed or written pages of a document. The scanner further includes a local functional processing unit, e.g., a processor, to carry out an optical character recognition (OCR) and/or optical symbol recognition (OSR) functions to generate processor recognizable characters and/or commands/instructions from the scanned image by the scanner. The OCR function can be carried out independently without relying instructions or commands received from a computer.

Another aspect of the invention is to save the document processed by a local OCR program in a memory as part of the local processor or saved in a portable data storage device. Furthermore, the processor recognizable characters generated by the OCR functional processor may include instructions recognized by the processor to carry out subsequent functions such as sending out the scanned image file as a facsimile to a facsimile device assigned with a facsimile destination number. Alternately, the instructions may instruct the processor to save the document generated by the OCR processor as a file and send the file as an e-mail attachment to a designate e-mail address.

It is one aspect of the present invention to provide additional user control features to an optical character recognition (OCR) program during the process of optically recognizing image characters. By applying these control features a user has more control of the output file types, the data formats, the document structures and different manners of content arrangements and presentations. The control features of the OCR program may include user input of one or several sample documents such that the OCR program may refer to these sample documents as reference to generate the output document. The OCR program may also be set up to allow the user to write the instructions directly on the document ready for inputting to a scanner. The instructions as written by the user can then be optically recognized and then applied to execute programs according to the user instructions that are optically recognized by the OCR program.

It is another aspect of the invention to provide the user an option for an OCR program to input real time user instructions. The OCR program then follows the real time user instructions to carry out either file process or data item rearrangements for the content of the document according to the user instruction as real time input to the OCR program.

Briefly, in a preferred embodiment, the present invention includes a computer peripheral apparatus (CPA) provided for connecting to a computer. The CPA includes a CPA processor to execute a CPA program to independently and directly carry out a document processing function without receiving an instruction from a computer. In an exemplary embodiment, the CPA includes a scanner for scanning a document and the CPA processor executes a optical character recognition (OCR) program to directly recognize characters included in the document scanned by the scanner. In another exemplary embodiment, the characters recognized by the OCR program further include instructions for instructing the CPA processor to execute a subsequent program to process the document scanned by the scanner. In another exemplary embodiment, the characters recognized by the OCR program further includes instructions for instructing the CPA processor to send a facsimile of the document scanned by the scanner to a facsimile destination. In another exemplary embodiment, the characters recognized by the OCR program further includes instructions for instructing the CPA processor to save the document recognized by the OCR program as a text file in a data storage as part of the CPA processor.

In another exemplary embodiment, this invention discloses a multi-functional peripheral (MFP) apparatus for a computer. The MFP apparatus includes a scanner for scanning a document and the computer responds automatically to the MFP apparatus after scanning the document for executing an optical character recognition (OCR) program for carrying out an OCR process on the document scanned by the MFP apparatus. In another exemplary embodiment, the document further includes a document processing instruction section and the OCR program further carrying out the OCR process for recognizing the document processing instruction section to activate the computer to execute a document processing program according to instructions included in document processing instruction section of the document. In another exemplary embodiment, the document further includes a document processing instruction section having a document storage instruction and the OCR program further carrying out the OCR process for recognizing the document storage instruction to activate the computer to execute a document storage program according to the document storage instructions included in the document processing instruction section of the document. In another exemplary embodiment, the document further includes a document processing instruction section having a document compress and storage instruction and the OCR program further carrying out the OCR process for recognizing the document compress and storage instruction to activate the computer to execute a document compress and storage program according to the document compress and storage instructions included in the document processing instruction section of the document. In another exemplary embodiment, the document further includes a document processing instruction section having a document facsimile instruction and the OCR program further carrying out the OCR process for recognizing the document facsimile instruction to activate the computer to execute a document facsimile program to send out a facsimile of the document according to the document facsimile instructions included in the document processing instruction section of the document.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIGS. 2A and 2B are an image document and a reference document respectively.

FIG. 4 is a diagram of a document for input to a scanner with a first section as embedded instructions for a scanner/OCR or facsimile/OCR program to process and to carry out functions provided in the embedded instructions in the first section of the image program.

DETAILED DESCRIPTION OF THE PREFERRED EMBODIMENT

Figure 1A:
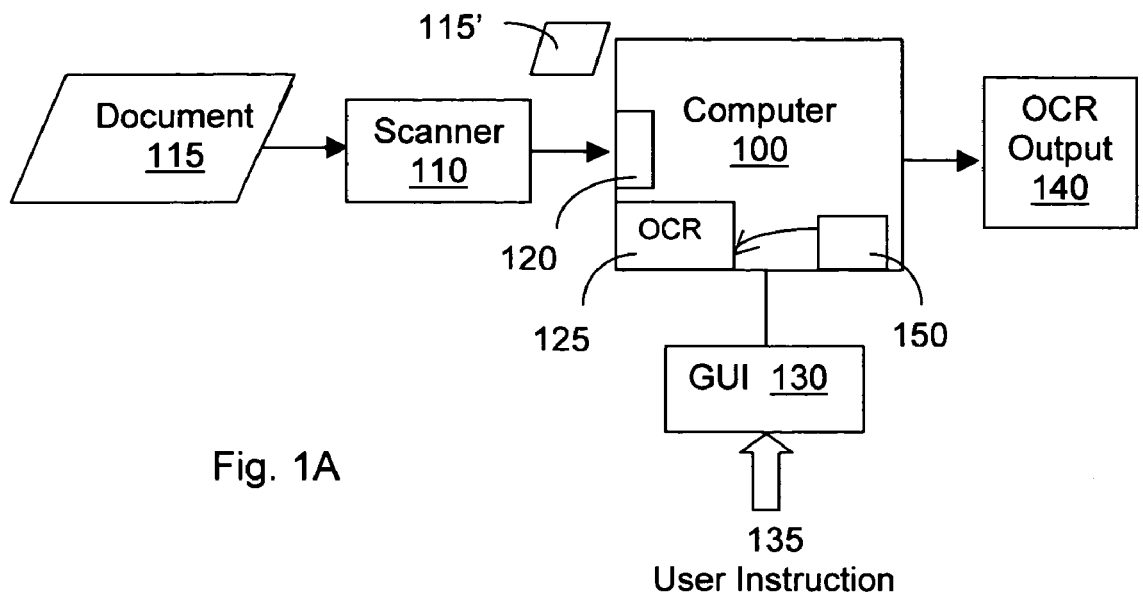
FIG. 1A is a system diagram to carry out an optical character recognition (OCR) program of this invention.

FIG. 1A is a functional block diagram for showing a computer 100 connected to scanner 110 for scanning a printed copy of a document 115. The computer 100 further includes a scanning program 120 to drive the scanner for capturing a scanned image 115' of the document 115. The computer 100 further includes an optical character recognition (OCR) program 125 to process the scanned image of the document 115 to convert the captured image file 115' into an electronically recognizable file such as a Microsoft Word, Excel or PowerPoint file. The computer further includes a graphic user interface (GUI) 130 for receive user instructions 135. The computer 100 receives the user instructions 135 for controlling the scanning process to generate and capture the image 115' of the document 115 and applying the OCR program 125 to process the image file to generate a OCR output file 140 as an electronically readable file. The computer 100 further receives a user instruction 135 through GUI 130 to apply a reference document 150 as a sample to generate the OCR output document 140. The reference document 150 can be applied in several ways according to the user's instructions 135. First of all, the OCR output document 140 can be generated according to the file type of the reference document. For example, if the reference document is a zip file with a particular data-compress format, the output of the OCR output document can be converted to a same "zip" file with identical data-compression format as the reference document. Of course there are broad selection of file formats a user can input through the GUI 130 for the OCR program 125 to generate an OCR output file according to the file format of the reference document 150.

Figure 1B:
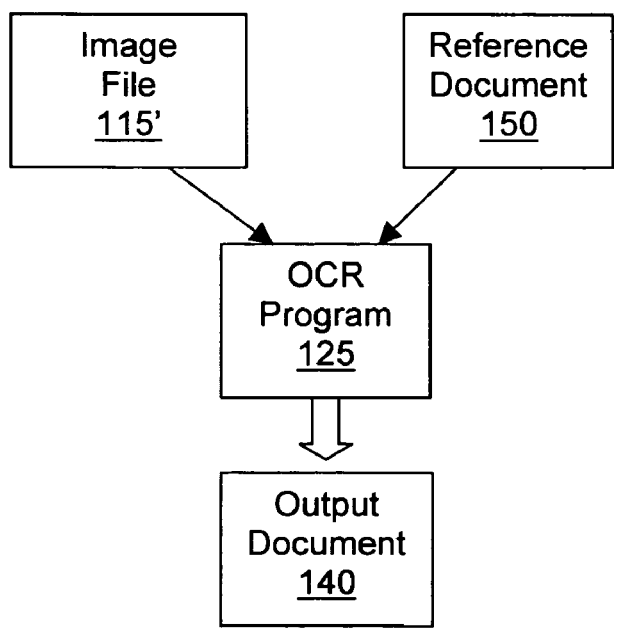
FIG. 1B is a flow chart showing a process for using a reference document as a sample for an OCR program.

The reference document 150 can also be inputted by the user through an input device of the computer 100 or can further be downloaded from a remote document source. Alternately, the reference can be inputted through the scanner 110 as another image document. FIG. 1B is a flow chart for showing the processes carried out by the OCR program 125. The OCR program receives first the image file as that scanned by the scanner 110 and also the reference document 150. The reference document 150 is used as a sample by the scanning program 140 to generate the output document 140.

In addition to applying the file format of the reference document to generate an OCR output file having a same file format as the reference document, the content arrangements or document structure as presented in the reference document can also be employed to "coach" or guide the OCR program to generate the OCR output document to have a same content arrange or document structure as that presented in the reference document. FIG. 2A is an image copy of the input document 115 for scanning into an image file by the scanner 110. FIG. 2B shows an exemplary reference document 150 that is stored in a storage device in the computer 100 and retrieved by the OCR program 125 as instructed by the computer user. The reference document 150 is also inputted to the OCR program 125 as instructed by the user. In this exemplary embodiment, the reference document 150 is already an electronically readable file such as a Microsoft Excel file. The reference document when inputted to the OCR program 125 is employed by the OCR program as a reference to generate an OCR output document 140. Based on the reference document, the OCR program generates the output document 140 structured to have a same file format as the reference document 150. For example, since the reference document 150 inputted to the OCR program is a Microsoft Excel file, the OCR program generates the output document as a Microsoft Excel file. Furthermore, since the reference document 150, as shown in FIG. 2B, lists the company name in column 1, the e-mail address in column 2, the phone number in column 3, and the product type in column 4, the OCR program 125 follows the same pattern to generate an output document 140. Furthermore, since the reference document 150 only lists information on the lower part of the document 115, the OCR program generates the output 140 also lists information presented in the lower part and totally ignores the upper part of the document 115.

An example of applying the reference document is for an OCR program to compress the image document and store that compressed file in a specific location as the reference document having a same compressed data format as provided in the reference document.

Figure 3:
FIG. 3 is a diagram to show a real time construction of a reference document with a user cuts and pastes elements of a document to a reference document for use by a OCR program.

Instead of inputting the reference document 150 as an electronically readable file, another feature of this invention is to allow a user to generate the reference document 150 in real time after a first step of optical character recognition is completed and before the OCR program 125 generates the final output document 140. FIG. 3 illustrates an example of such real time user operation where the top portion shows a partial document generated from an OCR program as the first page of a "first draft" document 160. After the generation of this first draft document 160, e.g., a Microsoft Word document, a user generates a real time reference document 170 by opening a Microsoft Excel document. Then the user "copy and paste" or "drag and drop" data items from the first draft document 160 to different columns and rows of the reference document 170. Based on the actions and patterns of the reference document, the OCR program then generates a final OCR output document by putting additional data into different columns of the Excel file according to the actions taken by the user as shown in FIG. 3.

In another preferred embodiment, a scanner program 120 that is implemented as a driver to drive the scanner may also includes an OCR function to optically recognize the first section of an image document such as that shown in FIG. 4. For example the first section of the image document provides an instruction for executing a data compression program to compress the scanned image file as a compressed document and to store this compressed document in a specific storage location in the computer system. The first section of the image document may be setup to provide instructions such that the scanner program can follow the instructions to carry out additional functions. These instructions may include a step to invoke another to carry different functions. These particular functions may or may not relate to the image document captured by the scanner. The first section of the image document may provide an instruction for reading a reference document and use the reference document as a sample to generate the OCR output document as describe above. Another example is to carry out an OCR to convert the image document into a machine-readable file with particular file format and also compress the OCR output document and also the image document into compressed documents to store these two documents into a particle storage device. This operation would therefore automate the archive processes and simplify the document scanning and storage processes without requiring multiple steps of human operations for scanning, compressing and storing the documents. With the image document stored together with the machine-readable file, it further enhance the organization of large amount of data and information because these files will be searchable now with the machine readable files stored together with the image file.

Another application is to apply such scanning/OCR functions into a facsimile device, i.e., a fax machine. The fax machine is connected to a computer to receive an incoming facsimiled image. Immediately after the image file is received, the computer execute an OCR program to recognize the first section of the image file to determine if it contains instructions to carry out further actions. Implementation of such scanner or facsimile machine with optical recognition features to recognized and carry out instruction embedded in the first section of an image document have many applications. A hand written notes can be sent to a home fax to turn on the light or activate a surveillance video camera since such instructions can be embedded in the written note that can be recognized by the computer to invoke predefined functions by a home computer or home security processor. A hand written instruction provided in the first segment of the facsimile image document may include instruction to further fax the image file to a group of people according to a group name store in the computer or instead sending the image file as an attachment to e-mail. A handwritten note or preferably an order form arranged according to a predefined template with blank boxes can be marked by a customer and customer information filled in by a customer by pen or pencil. The customer can send this order form by fax to a store fax. The store fax then automatically recognized the first part of the image document to process the order according the user instruction provided in the first section accordingly. For the purpose of privacy and security, the first section may include a section for password and user name such that the instructions can be processed according to different level of privileges. The fax and OCR order can improve the efficiency than orders by phone because there is no requirement of real human response and such order or execution can be provided with more clarity in writing and also more complicate instruction can be provided. It also provides convenience that a user does not have to log on a networked computer to process these data transmission in order to carry out these transactions.

A multi-functional peripheral (MFP) apparatus of a computer is disclosed in this invention that includes a scanner for scanning a document. The MFP apparatus further includes a user interface including a push button disposed on the MFP apparatus for a user to press down the push button to activate the scanner of the MFP apparatus to scan a document and activate the computer to execute an optical character recognition (OCR) program for carrying out an OCR process on the document scanned by the MFP apparatus. In another exemplary embodiment, the document further includes an instruction section and the OCR program further carrying out the OCR process for recognizing the instruction section to activate the computer to execute another program according to instructions included in the instruction section of the document. In another exemplary embodiment, the document further includes a document processing instruction section and the OCR program further carrying out the OCR process for recognizing the document processing instruction section to activate the computer to execute a document processing program according to instructions included in document processing instruction section of the document. In another exemplary embodiment, the document further includes a document processing instruction section having a document storage instruction and the OCR program further carrying out the OCR process for recognizing the document storage instruction to activate the computer to execute a document storage program according to the document storage instructions included in the document processing instruction section of the document. In another exemplary embodiment, the document further includes a document processing instruction section having a document compress and storage instruction and the OCR program further carrying out the OCR process for recognizing the document compress and storage instruction to activate the computer to execute a document compress and storage program according to the document compress and storage instructions included in the document processing instruction section of the document. In another exemplary embodiment, the document further includes a document processing instruction section having a document facsimile instruction and the OCR program further carrying out the OCR process for recognizing the document facsimile instruction to activate the computer to execute a document facsimile program to send out a facsimile of the document according to the document facsimile instructions included in the document processing instruction section of the document.

Figure 5:
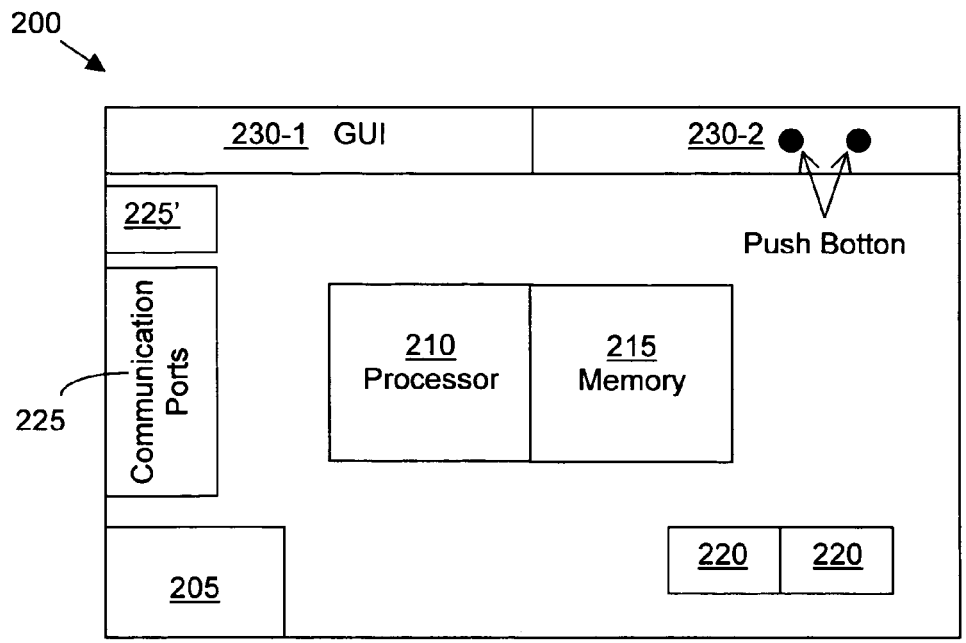
FIG. 5 is a functional block diagram of a computer peripheral apparatus (CPA) of the present invention.

FIG. 5 is a functional block diagram for showing the system configuration for a computer peripheral apparatus (CPA) 200 of this invention. The computer peripheral apparatus (CPA) 200 may be a printer, an image display apparatus such as a monitor or a video projector, a multi-function peripheral (MFP) apparatus, etc. The CPA includes a computer connection interface port 205 provided for connecting to a computer. The CPA 200 further includes a CPA processor 210 to execute a CPA program to independently and directly carry out a document processing function, a display function, or any other computer peripheral functions. The CPA processor 210 can execute the functional programs without receiving an instruction from a computer.

The CPA further includes a memory 215 to provide data storage to function together with the CPA processor 210. The CPA further includes interface ports 220 for adapting to external devices such as portable data storage devices that may includes USB data storage devices, external hard drive, and/or other external data storage devices or functional devices. The CPA may also include network and/or telephonic communication ports 225 for connecting to networks with wireless communication or telephonic lines to carry out communications through network connection or telephonic lines. The CPA 200 may further include computer peripheral apparatus (CPA) connection ports 225' to connect to another CPA, such as a computer monitor connecting to a printer, a printer connected to a computer key board directly, etc. The CPA further includes user interfaces 230 that may include a graphic user interface (GUI) 230-1 and push buttons 230-2 or other user input ports for receiving user input to command and control the CPA. The user input port may comprise a thumb print scanner to receive an image of user's thumb print to activate a specific function to carry out predefined tasks. The user input port may comprise other biometric authentication devices such as a video camera or an audio input device to authenticate the identity of a user to either automatically activate the CPA or to allow the user to activate the CPA to carry out user selected functions or tasks.

Since the CPA 200 may or may not be connected to a computer that is not specifically shown in FIG. 5, furthermore, the user of this CPA 200 may or may not have authority to access to the computer. For security purpose, the CPA processor 210 may includes a security check to allow or disallow a CPA user to access data stored in a computer connected either directly or through a network to the CPA 200. The user without authority to access the computer is strictly limited to the operations and functions provided by the CPA processor 210 and the CPA 200. With the CPA processor 210, a user of the CPA 200 is allowed to perform more local functions such as printing a documents, sending out a facsimile, scan a document followed by carrying out an OCR program and storing the document outputted by the OCR program in a removable data storage device, etc.

Figure 6:
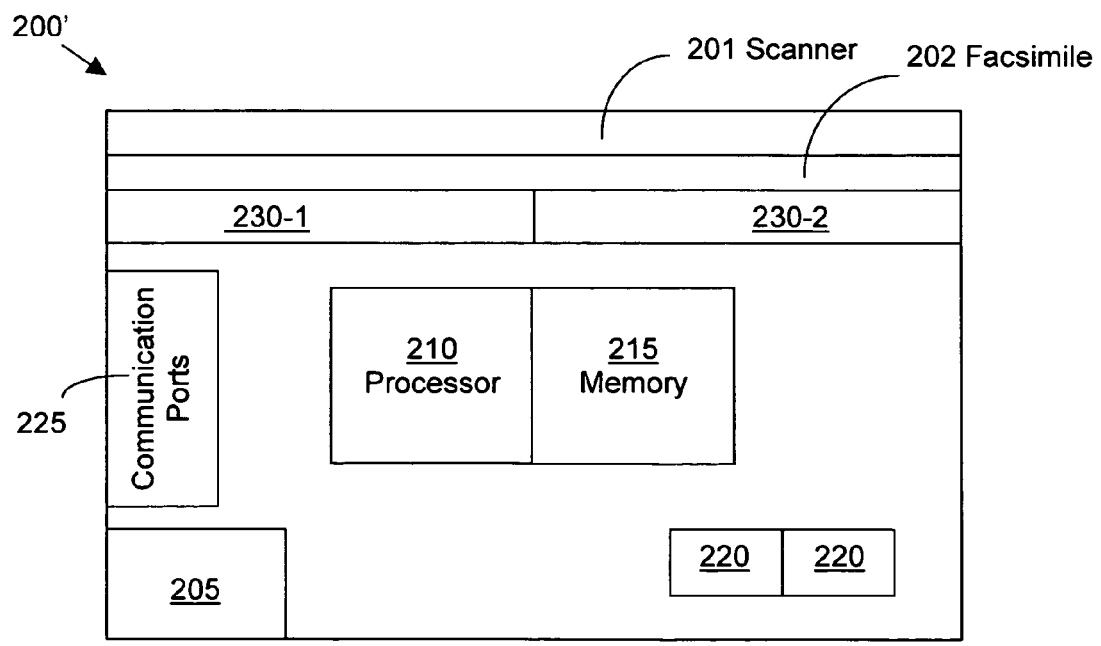
FIG. 6 is a functional block diagram of another CPA implemented as a multi-functional copier (MFC) of this invention.

FIG. 6 shows an exemplary embodiment of a CPA 200' that is a multi-function peripheral (MFP) apparatus, such as a multi-functional copier (MFC). The MFC 200' includes a scanner 201 to scan a document. The CPA processor 210 then executes an optical character recognition (OCR) program to directly recognize characters included in the document scanned by the scanner. The characters recognized by the OCR program further include instructions for instructing the CPA processor 210 to execute a subsequent program according to the instructions to process the document scanned by the scanner. In this specific exemplary embodiment, the MFP apparatus 200' further includes a facsimile device 202. The characters recognized by the OCR program include instructions for instructing the CPA processor to send a facsimile of the document scanned by the scanner to a facsimile destination. Alternately, the characters recognized by the OCR program may further include instructions for instructing the CPA processor 210 to save the document recognized by the OCR program as a text file in the memory 215 that is accessible by the CPA processor 210 to function as part of the CPA processor 210. Alternately, the text file may be saved in a data storage device such as a "memory stick" or other devices adapted to the CPA through the interface ports 220.

Figure 7:
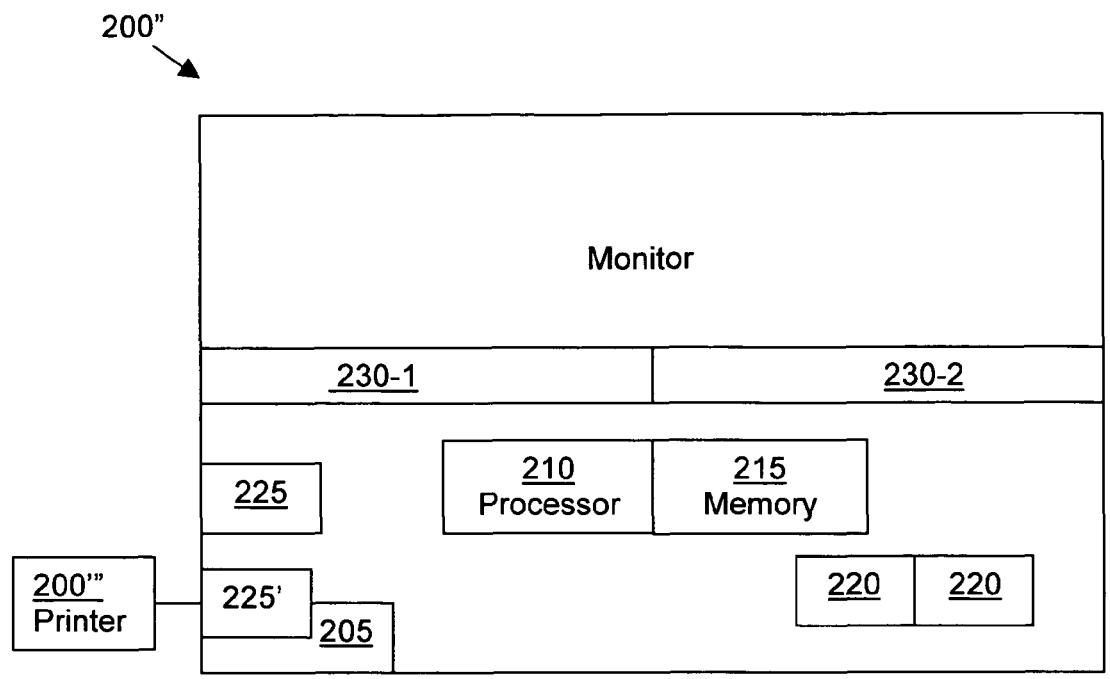
FIG. 7 is a functional block diagram of another CPA implemented as a computer monitor as an independently operable image display device of this invention.

FIG. 7 shows another exemplary embodiment of a CPA that is a computer monitor 200" functioning as an image display device of this invention. The CPA 200" includes external device interface ports 220 to adapt to external devices such as a data storage device that includes files. The CPA processor 210 processes the files and receives user instructions from the user through the user interface 230 to display the images accordingly. Alternately, the monitor 200" may be connected to a printer as another CPA 200''' either through the network communication ports 225 or through wireless connections or through a special peripheral apparatus connection port 225', and the user may have an option to print out the document through an instruction sent to the CPA processor 210. This invention therefore discloses a first CPA that includes a CPA processor and a connection port to a second CPA to perform a second CPA function. The first CPA further includes an external data storage device port to adapt to an external data storage device and the first CPA further includes a user interface to receive a user input for commanding the CPA processor to execute a program to perform the second CPA function on the second CPA. An exemplary embodiment may be a monitor 200" that includes a CPA processor to adapt to a USB data drive to print out a document on a printer as a second CPA connected to the monitor as the first CPA with a CPA processor to read and control the printer to print the document stored in the USB data storage device.

Figures 8A, 8B:
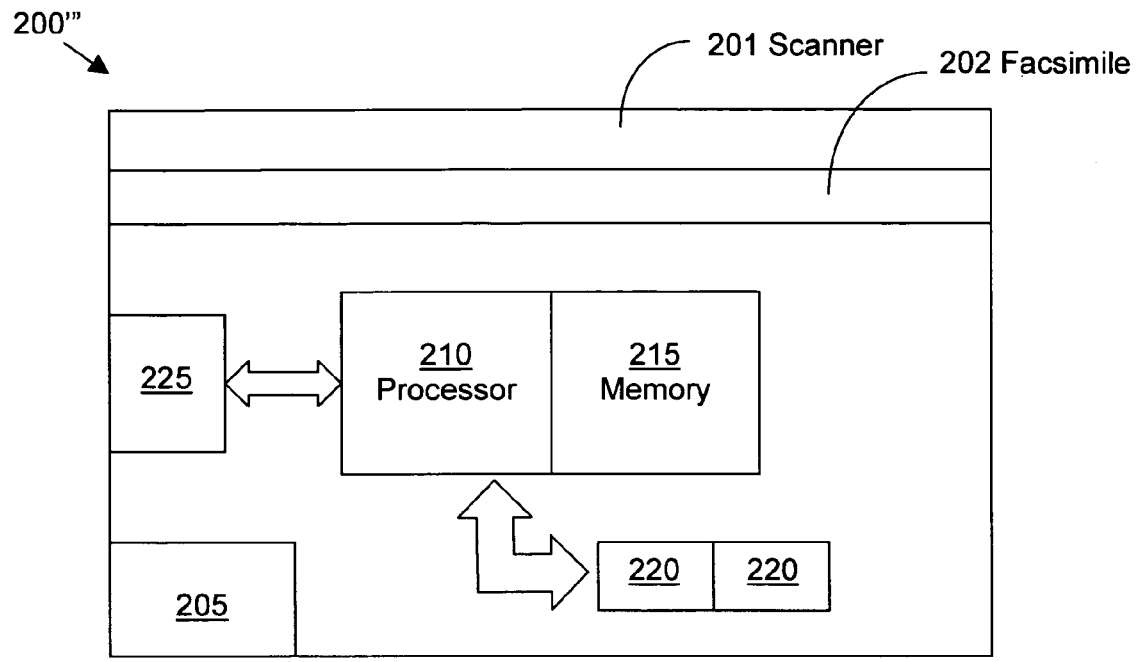
FIG. 8A is a functional block diagram of another multifunction peripheral (MFP) apparatus; such as a multi-functional copier and controller (MFCC) of this invention.
FIG. 8B shows a copy of document for inputting to the MFP for user ID authentication to instruct and the MFP processor for carrying out different tasks.

Referring to FIG. 8A for another exemplary embodiment of a CPA 200''' that is another multi-function peripheral (MFP) apparatus, such as a multi-functional copier and controller (MFCC). The MFCC 200''' includes a scanner 201 to scan a document and a facsimile 202 to receive an image file transmitted as facsimile through communication network. The CPA processor 210 then executes an optical character recognition (OCR) program to directly recognize characters included in the document scanned by the scanner. The characters recognized by the OCR program further include instructions for instructing the CPA processor 210 to execute a subsequent program according to the instructions to process the document scanned by the scanner. FIG. 8B shows an image file as a specific exemplary embodiment where the scanned or received by the facsimile 202 includes a handwriting instruction to turn on a set of lights in the house and the monitoring video camera in specific areas around the house. The scanned or facsimiled image as shown in FIG. 8B is recognized by the OCR program. The scanned or facsimiled image copy received by the MFCC further includes at least on authorization and authentication mark such as a signature, a password, a particular security answer to a security question pre-designated by a user, a thumbnail print, or other biometric mark. The MFCC further includes a CPA processor 210 to carry out an authorization and authentication (A&A) check based on these authorization and authentication marks exemplified in FIG. 8B. After the completion of the A&A check, the CPA processor 210 then carries out the designated functions specified in the image file either as a scanned copy or as a facsimiled image file.

A computer peripheral apparatus (CPA) is disclosed in this invention that includes a device for directly receiving an input image file includes a user-specific image. The CPA further includes a processor for applying the user-specific image for executing a user identification authentication process for authenticating the identification of the user inputting the user-specific image to the CPA. In an exemplary embodiment, the device for receiving the input image file is a scanner. In another exemplary embodiment, the device for receiving the input image file is a facsimile device. In another exemplary embodiment, the processor of the CPA further includes an executable optical character recognition (OCR) functional unit to recognize the input image file for recognizing an instruction as part of the input image file to execute the user identification authentication process. In another exemplary embodiment, the processor of the CPA further recognizes other instructions in the input image file for carrying out additional tasks.

Figure 9:
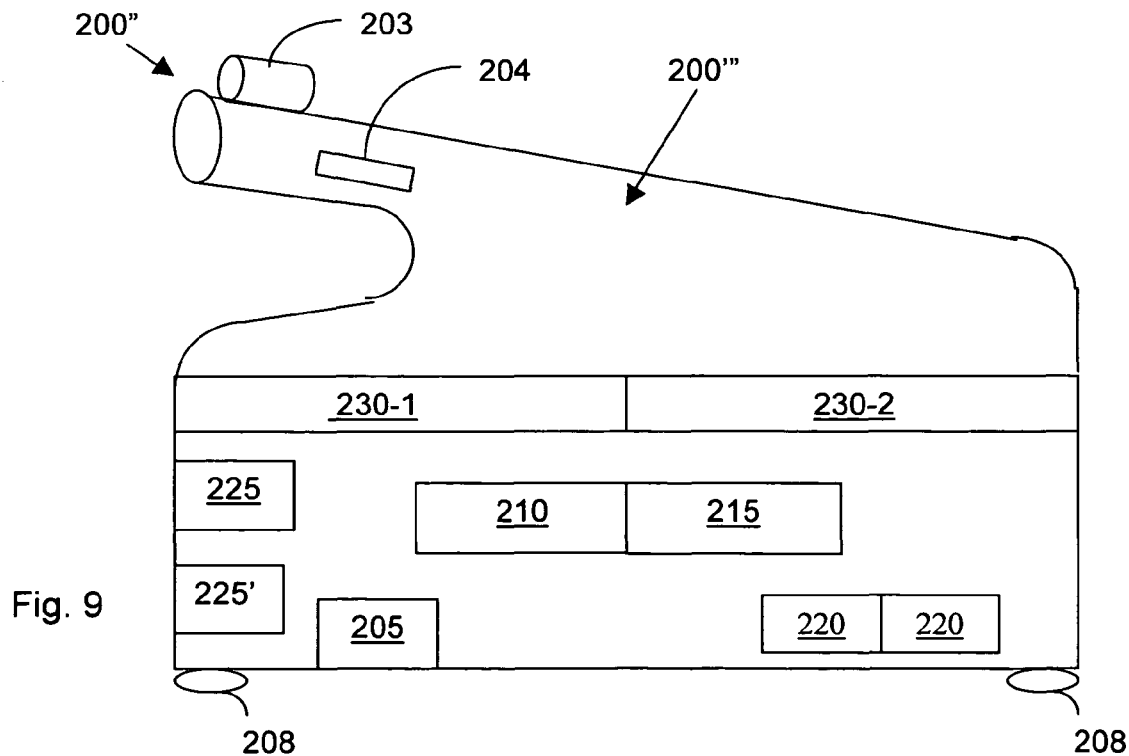
FIG. 9 is a functional block diagram of another CPA implemented as an image projector as an independently controllable image projector with focus and projecting lens adjustment functions of this invention.

FIG. 9 is a functional block diagram for showing another exemplary embodiment of a CPA that is an image projector 200"". The image projector 200"" includes external device interface ports 220 to adapt to external device such as a data storage device that includes image files for display by the image projector 200"". The image projector 200"" includes a video camera 203 to take picture of the images of the surface for image projection. The image projector further includes a projector position adjustment and control mechanism 208 controlled either by a special position controller or directly by the CPA processor 210. The images taken by the video camera 203 is used by an auto focus controller 204 of the image projector 200"" and the processor 210 to control the position of the projecting lens 209 and the projector position adjustment and control mechanism 208 to assure best image quality can be achieved. When the images taken by the video camera 203 is out of focus, the image is used by the auto focus controller 204 and/or the CPA processor 220 to adjust the position of the projection lens 209. When the images taken by the video camera 203 are not properly projected to a best position on the surface for image projection, then the projector position adjustment and control mechanism 208 is controlled by the CPA processor to adjust the position and of the projector 200'''' and the projecting lens 209.

A computer peripheral apparatus (CPA) is disclosed in this invention that includes an image projection device for directly receiving an image file for projecting images therefrom. The image projection device further includes a video camera for photographing images projected from the image projection device for inputting to a CPA processor. The image projection device further includes an auto-focusing and optical adjustment mechanism controlled by the CPA processor applying the images photographed by the video camera for automatically adjusting an image projection optics and positions and orientations of the image projection device to improve image qualities of the images projected by the image projection device.

According to above descriptions, an embodiment of this invention is disclosed that includes a multi-functional peripheral apparatus. The multi-functional peripheral device includes a scanner for scanning a document. The multi-functional peripheral apparatus further includes a processor for performing an optical character recognition (OCR) function for directly recognizing characters contained in the document without using a computer. In another exemplary embodiment, the process further recognizes characters in the document as processor instructions for instructing and commanding the processor to carry out a function as indicated by the instructions. In another exemplary embodiment, the multi-functional peripheral apparatus further includes a facsimile device connecting to a communication line for sending a facsimile. And, the processor further recognizes characters in the document as processor instructions for sending a facsimile to a specified number indicated in the document for sending a scanned image of the document to as a facsimile to the specified number.

According to above descriptions, an embodiment of this invention is disclosed that includes a multi-functional peripheral apparatus. The multi-functional peripheral device includes a scanner for scanning a document. The multi-functional peripheral apparatus further includes a processor for performing an optical character recognition (OCR) function for directly recognizing characters contained in the document without using a computer. In another exemplary embodiment, the process further recognizes characters in the document as processor instructions for the processor to carry out a function as indicated by the instructions. In another exemplary embodiment, the multi-functional peripheral apparatus further includes a facsimile device connecting to a communication line for sending a facsimile. And, the processor further recognizes characters in the document as processor instructions for sending a facsimile to a specified number indicated in the document for sending a scanned image of the document to as a facsimile to the specified number.

Therefore, according to above descriptions, in an exemplary embodiment, this invention discloses a facsimile machine that includes an optical character recognition (OCR) functional unit to recognized characters on an incoming facsimile document as an instruction to carry out a function or a task according to the instruction. In another exemplary embodiment, this invention disclose a computer peripheral apparatus (CPA) that includes a user interface having a user identification device for automatically recognizing a user's identification to carry out a function of the computer peripheral device. In one exemplary embodiment, this CPA is connected to and receiving commands and instruction from a computer. In another exemplary embodiment, this CPA independently carries out a CPA function not relying on communication signals with the computer.

According to above descriptions, this invention discloses a multi-functional peripheral (MFP) apparatus for a computer. The MFP includes a scanner for scanning a document. The MFP further includes a user interface disposed on the MFP apparatus for a user to activate the scanner to scan a document and automatically activate optical character recognition (OCR) program for recognizing at least one optical character on the document scanned by the MFP apparatus. In an exemplary embodiment, the OCR program further recognizes at least a designated character as an instruction to activate a subsequent process according to the instruction. In an exemplary embodiment, the user interface further comprising a push button disposed on the MFP for the user to press down the push button to activate the scanner. In an exemplary embodiment, the user interface further comprising a thumb print scanner for scanning a thumb print of the user. In an exemplary embodiment, the user interface further comprising a biometric identification device for receiving a biometric characteristic of the user and identifying an identity of the user. In an exemplary embodiment, the MFP apparatus further connected to the computer for automatically activating the computer to execute the OCR program. In an exemplary embodiment, the OCR program further recognizes at least a designated character comprising a set of bar codes as an instruction to activate a subsequent process according to the instruction. In an exemplary embodiment, the OCR program further recognizes at least a designated character comprising hand written instructions as an instruction to activate a subsequent process according to the instruction. In an exemplary embodiment, the OCR program further recognizes at least a designated character comprising a graphic element as an instruction to activate a subsequent process according to the instruction. In an exemplary embodiment, the OCR program further recognizes at least a designated character to activate a subsequent process according to the instruction to process the document scanned by the scanner. In an exemplary embodiment, the OCR program further recognizes at least a designated character to activate a subsequent process according to the instruction to process the document scanned by the scanner. In an exemplary embodiment, the OCR program further recognizes at least a designated character to activate a subsequent process to store the document scanned by the scanner in a designated location according to the instruction. In an exemplary embodiment, the OCR program further recognizes at least a designated character to activate a subsequent process to compress and store the document scanned by the scanner in a designated location for reducing a storage space according to the instruction. In an exemplary embodiment, the OCR program further recognizes at least a designated character to activate a subsequent process to activate an facsimile on the MFP to send out an facsimile according to the instruction. In an exemplary embodiment, the OCR program further recognizes at least a designated character to activate a subsequent process to activate an electronic processing function on the MFP to send out an electronic mail (e-mail) according to the instruction. In an exemplary embodiment, the MFP further includes a MFP processor for performing an optical character recognition (OCR) function for directly recognizing characters contained in the document without requiring the data handling system to execute a process for controlling and directing the MFP apparatus. In an exemplary embodiment, the MFP further includes a facsimile for receiving an incoming facsimile document and automatically activate optical character recognition (OCR) program for recognizing at least one optical character on the incoming facsimile document. In an exemplary embodiment, the facsimile for receiving an incoming facsimile document and automatically activate optical character recognition (OCR) program for recognizing at least one optical character on the incoming facsimile document as the instruction to activate the subsequent process according to the instruction. This invention further discloses a multi-functional peripheral (MFP) apparatus for a computer. The MFP includes a facsimile for receiving an incoming facsimile document. The MFP further includes an optical character recognition (OCR) program for automatically recognizing at least one optical character on the incoming facsimile document received by the MFP apparatus.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A multi-functional peripheral (MFP) apparatus for a computer comprising:
    a scanner for scanning a document; and
    a user interface disposed on said MFP apparatus for a user to activate said scanner to scan a document and automatically activate, without requiring any further action from the user, an optical character recognition (OCR) program for recognizing at least one optical character on said document scanned by said MFP apparatus.

2. The MFP apparatus of claim 1 wherein:
    said OCR program further recognizes at least a designated character as an instruction to activate a subsequent process according to the instruction without requiring any further action from the user.

3. The MFP apparatus of claim 1 wherein:
    said OCR program further recognizes said characters in a designated section as an instruction to activate a subsequent process according to the instruction without requiring any further action from the user.

4. The MFP apparatus of claim 1 wherein:
    said user interface further comprising a push button disposed on said MFP for said user to press down said push button to activate said scanner to scan a document and automatically activate, without requiring any further action from the user, the OCR program.

5. The MFP apparatus of claim 1 wherein:
    said user interface further comprising a thumb print scanner for scanning a thumb print of said user.

6. The MFP apparatus of claim 1 wherein:
    said user interface further comprising a biometric identification device for receiving a biometric characteristic of said user and identifying an identity of said user.

7. The MFP apparatus of claim 1 wherein:
    said MFP apparatus further connected to said computer for automatically activating said computer to execute said OCR program without requiring any further action from the user.

8. The MFP apparatus of claim 1 wherein:
    said OCR program further recognizes at least a designated character comprising a set of bar codes as an instruction to activate a subsequent process according to the instruction without requiring any further action from the user.

9. The MFP apparatus of claim 1 wherein:
    said OCR program further recognizes at least a designated character comprising hand written instructions as an instruction to activate a subsequent process according to the instruction without requiring any further action from the user.

10. The MFP apparatus of claim 1 wherein:
    said OCR program further recognizes at least a designated character comprising a graphic element as an instruction to activate a subsequent process according to the instruction without requiring any further action from the user.

11. The MFP apparatus of claim 1 wherein:
    said OCR program further recognizes at least a designated character to activate a subsequent process executable by the computer, without requiring any further action from the user, according to the instruction.

12. The MFP apparatus of claim 1 wherein:
    said OCR program further recognizes at least a designated character to activate a subsequent process to further process said document scanned by said scanner according to the instruction without requiring any further action from the user.

13. The MFP apparatus of claim 1 wherein:
    said OCR program further recognizes at least a designated character to activate a subsequent process to store said document scanned by said scanner in a designated location according to the instruction without requiring any further action from the user.

14. The MFP apparatus of claim 1 wherein:
    said OCR program further recognizes at least a designated character to activate a subsequent process to compress and store said document scanned by said scanner in a designated location for reducing a storage space according to the instruction without requiring any further action from the user.

15. The MFP apparatus of claim 1 wherein:
    said OCR program further recognizes at least a designated character to activate a subsequent process to activate an facsimile on said MFP to send out an facsimile according to the instruction without requiring any further action from the user.

16. The MFP apparatus of claim 1 wherein:
    said OCR program further recognizes at least a designated character to activate a subsequent process to activate an electronic processing function on said MFP to send out an electronic mail (e-mail) according to the instruction without requiring any further action from the user.

17. The MFP apparatus of claim 1 further comprising:
    a MFP processor for performing an optical character recognition (OCR) function for directly recognizing characters contained in said document without requiring said data handling system to execute a process for controlling and directing said MFP apparatus without requiring any further action from the user.

18. The MFP apparatus of claim 1 further comprising:
    a facsimile for receiving an incoming facsimile document and automatically activate optical character recognition (OCR) program for recognizing at least one optical character on said incoming facsimile document without requiring any further action from the user.

19. The MFP apparatus of claim 1 wherein:
    a facsimile for receiving an incoming facsimile document and automatically activate optical character recognition (OCR) program for recognizing at least one optical character on said incoming facsimile document as said instruction to activate said subsequent process according to the instruction without requiring any further action from the user.

20. A multi-functional peripheral (MFP) apparatus for a computer comprising:
    a facsimile for receiving an incoming facsimile document; and
    an optical character recognition (OCR) program for automatically recognizing at least one optical character on said incoming facsimile document received by said MFP apparatus without requiring any manual action from a user of the computer or the MFP.

* * * * *